United States Patent [19]
Vogel et al.

[11] 3,745,807
[45] July 17, 1973

[54] TERMINAL APPLICATOR

[75] Inventors: Ralph A. Vogel, Three Rivers, Mich.; Harold F. Bratt, Columbus, Ohio

[73] Assignee: Essex International, Inc., Fort Wayne, Ind.

[22] Filed: Jan. 14, 1972

[21] Appl. No.: 217,831

[52] U.S. Cl............ 72/421, 29/203 DT, 29/203 S, 226/150, 226/162
[51] Int. Cl.......................................... B21d 43/06
[58] Field of Search................... 72/424, 428, 421, 72/307; 29/630 A, 203 D, 203 DT, 203 S; 221/278; 226/162, 150; 83/223; 100/215, 216, 224, 269

[56] References Cited
UNITED STATES PATENTS
3,578,230   5/1971   Baldyga............................ 226/162

Primary Examiner—Charles W. Lanham
Assistant Examiner—Joseph A. Walkowski
Attorney—A. W. Molinare et al.

[57] ABSTRACT

In a power operated press of the type having a slide head which is reciprocal between retracted and advanced positions toward and away from articles being worked upon, an article feed assembly includes a fluid operated feed finger which is moved toward the slide head so as to feed the articles when the slide head is retracted and which is retracted by the introduction of a pressurized gas into a feed cylinder when the slide head is advanced. The pressurized gas, preferably air, is provided by a pumping action effected by the slide head guide post when the slide head is moved toward the advanced position. Once the feeding finger has been fully retracted, it is slowly advanced in the feeding direction independently of the speed at which the slide head is retracted by the action of a bleed orifice which controls the discharge of the pressurized gas from the feed cylinder.

13 Claims, 5 Drawing Figures

3,745,807

TERMINAL APPLICATOR

BACKGROUND AND SUMMARY OF THE INVENTION

This invention relates to a press assembly and, more particularly, to a press assembly, such as that of a terminal applicator, in which an article feed mechanism feeds the article to be worked upon into working position in the assembly.

In pressing and stamping machines feed mechanisms have been provided for automatically and sequentially feeding given articles which are to be worked upon to the die and anvil work area of the assembly. Feeding mechanisms have been employed in the past which are operated in response to movement of the tool carrying slide head of the press to sequentially feed given articles to the work area each time the slide head is retracted, such that an article is positioned in readiness upon the anvil for the next stamping movement of the slide head. By way of example, one such prior assembly employs a pair of hydraulic cylinders for operation of the feed mechanism. One of the cylinders, a separate loading cylinder, is positioned such that its piston is contacted by the slide head, just prior to the slide head reaching its fully advanced article working position, to pressurize hydraulic fluid. This pressurized fluid, in turn, is introduced to the feed cylinder to urge the feed piston and an article feed carriage toward the retracted position. When the feed carriage has been fully positioned in its retracted position, an elaborate latching arrangement locks the carriage in the retracted position during withdrawal of the slide head toward its retracted position. At a given point during withdrawal of the slide head, the latching arrangement is released by the slide head movement and the slide carriage is moved in the feed direction by spring pressure and the hydraulic fluid in the feed cylinder is returned to the load cylinder.

The present invention overcomes many of the disadvantages of the above described assembly. In the present invention, the feed mechanism is pneumatically operated. Thus, the present invention is not only markedly structurally simplified over such hydraulically operated mechanisms, but also is not sensitive to temperature changes and the leakage of oil to which hydraulically operated mechanisms are subject. Moreover, in the present invention lower fluid feeding pressures are developed than those which generally occur in hydraulically operated mechanisms thereby substantially reducing material expenses, the likelihood of damage to the articles being worked upon in the event of jamming of the assembly and also reducing the likelihood of injury to the operator of the assembly. In the present invention, the need for separate pressure pumps is eliminated, the slide head guide post construction of the assembly of the invention being constructed to both function in the guidance of the slide head between its advanced and retracted positions and also as a fluid pressurizing pump which provides a source of pressurized air for the operation of the feed mechanism of the invention. The need for elaborate latching mechanisms to hold the feed mechanism in its retracted position is obviated in the present invention. Moreover, the feed mechanism of the present invention may be maintained in its retracted position by way of a simple valve mechanism and its movement in the feeding direction delayed by simple, but effective, bleed means. Finally, in the present invention, the feed mechanism of the assembly is movable in its feeding direction at a rate of speed which is independent of the speed at which the slide head is retracted.

In a principal aspect, an assembly incorporating the principles of the present invention includes a power operated slide head movable between retracted and advanced positions forward and away from the articles being worked upon and a feed assembly having movable article engaging means and a fluid cylinder with a piston therein for reciprocating the article engaging means both in a feeding direction, in which articles to be worked upon are fed beneath the slide head, and in a retractive diection. Fluid pressurizing means introduces fluid under pressure to the piston to urge it in the retractive direction and force exerting means urges the piston in the feeding direction. An important feature of the invention resides in guide post means having a first stationary member and a second movable member which is attached to the slide head and is movable therewith and relative to the first member. The fluid pressurizing means is formed by the guide post means and includes a sealed pumping chamber defined between the first and second members and conduit means communicates this chamber and the cylinder. Thus, in the present invention, the guide post means both guides the movement of the slide head between its retracted and advanced positions and also urges the piston and article engaging means in its retractive direction.

In another aspect of the invention, bleed means restricts movement of the article engaging means in the feeding direction by restricting the discharge of fluid from the feed mechanism cylinder.

In still another aspect of the invention, the flow of fluid through the bleed means may be selectively controlled such that this flow may be stopped altogether so as to retain the article engaging means in its fully retracted position.

These and other objects, features and advantages of the present invention will be more clearly understood through a consideration of the following detailed description.

BRIEF DESCRIPTION OF THE DRAWING

In the course of this description, reference will frequently be made to the attached drawing in which.

DESCRIPTION OF THE PREFERRED EMBODIMENTS

Figure 1:
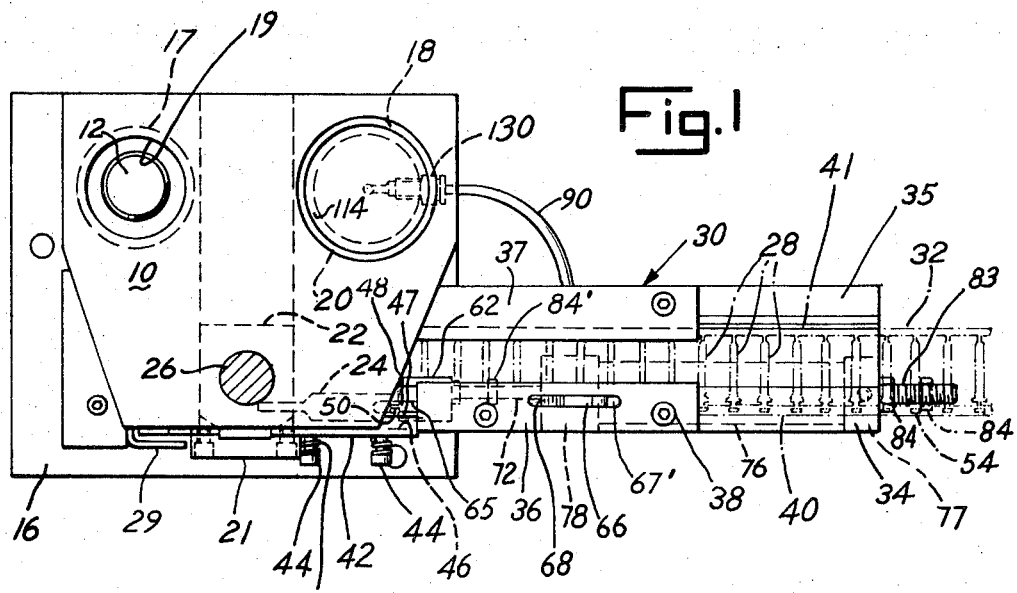
FIG. 1 is a plan view of a preferred embodiment of terminal applicator assembly constructed in accordance with the principles of the invention.
Figure 2:
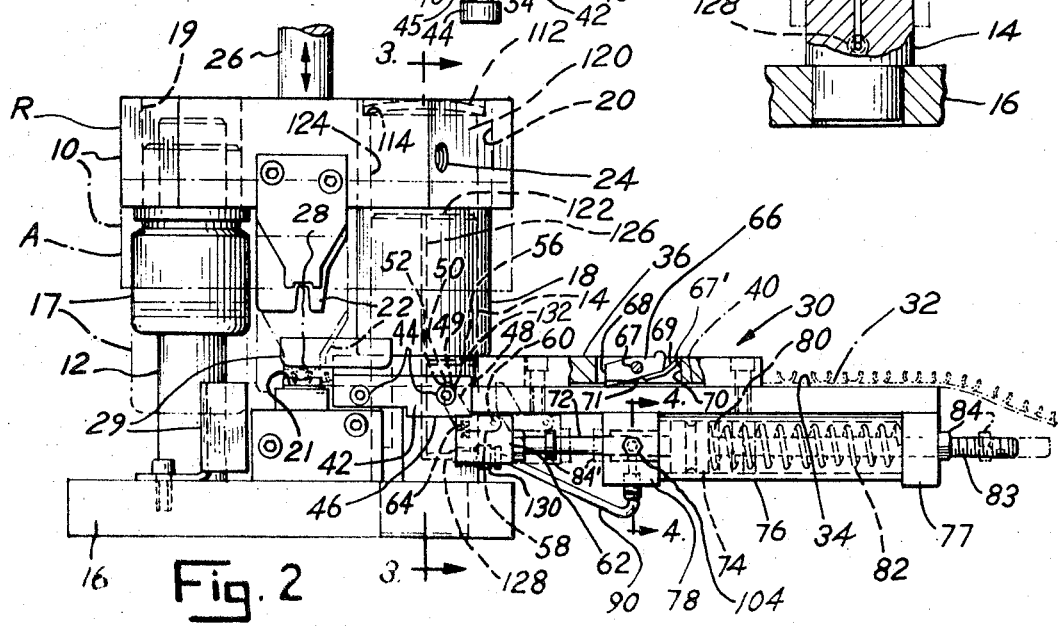
FIG. 2 is a side elevation view of the terminal applicator assembly shown in FIG. 1.

Referring to FIGS. 1 and 2, a preferred embodiment of assembly which is constructed in accordance with the principles of the invention is shown in the form, by way of example, of a terminal applicator for fixing electrical terminals to the ends of conductor leads. In the terminal applicator of the invention, a slide head 10 is slideably positioned upon at least a pair of guide posts 12 and 14 which, in turn, are stationarily fixed to a suitable heavy rigid base member 16. Cylindrical bushings 17 and 18 are fixed in bored openings 19 and 20 respectively in the slide head and these bushings, in turn, are slideably positioned over the guide posts 12 and 14, respectively, and guide the movement of the slide head 10 between a retracted position R as shown in solid in FIG. 2 and an advanced article working position A as shown in dot and dash.

In such terminal applicators, an anvil 21 is stationarily positioned upon the base member 16 and a suitable tool die construction 22 is mounted, such as by a suitable locking screw construction 24, to the slide head such that when the slide head is moved by way of a force exerted upon ram 26 to its advanced position A, the die and anvil cooperate with each other to perform the desired work upon an article, such as a terminal 28 to which the conductor lead (not shown) is to be connected, and which has been positioned upon the anvil as shown in FIG. 2. In addition, suitable scrap guards 29 may be provided about anvil 21 to protect the assembly operator.

A feed mechanism, generally 30, is also provided for feeding the terminal blanks 32, the individual terminals 28 of which are to be worked upon by the die and anvil of the applicator, to the anvil 21. The feed mechanism includes a pair of spaced parallel supporting rails 34 and 35 upon which the terminal blank 32 rests and a pair of overlying guide rails 36 and 37. The guide rails 36 and 37 are attached as by bolts 38 and respectively are spaced slightly above the supporting rails 36 and 37 such that the edge strips 40 and 41 of the blanks may be fed between the overhead guide rails and the supporting rails and thereby are vertically restrained during movement toward the anvil 21.

In addition, a spring rail 42 is preferably provided adjacent the end of the rails nearest the anvil to laterally position the terminal blank 32 prior to the passage of its leading terminal to and upon the anvil. As shown particularly in FIGS. 1, 2 and 5, the spring rail 42 includes a plurality of spaced bolts 44 which are mounted to the side of the supporting rail 34 and springs 45 on each of the bolts which exert a force between the bolt head and a downward extending flange 46 of the spring rail 42 such that the edge 47 of the spring rail is urged toward the edge strip 40 of the terminal blank to laterally position the blank.

The feed mechanism of the present invention also includes a feed finger 48 comprising an upstanding finger portion 49, the tip 50 of which extends slightly above the upper surface of the support rails 34 and 35 such that it is capable of engaging the blank 32 and feeding the blank toward the anvil. The tip 50 of the feed finger is somewhat reduced in width relative to the width of the finger portion 49 and includes a substantially vertical forward latching edge 52 which is adapted to be received in and engage, by way of example, small apertures 54 in one of the edge strips 40 of the terminal blank. The reduced width tip 50 also includes a somewhat rounded rear facing cam surface 56 which slides, by way of a non-engaging camming action, along the underside of the terminal blank as the feed finger is being retracted as will be more fully explained later. The feed finger 48 also includes a rearward extending leg 58 which is pivotally mounted by a pivot pin 60 to a feed finger bracket 62. A small spring 64 is positioned in the feed finger bracket so as to exert an upward force against the lower forward edge of the feed finger leg 58 such that the feed finger is continuously urged upward through a slot 65, such that the latching surface 52 projects slightly above the upper surface of support rail 34, as shown in FIG. 2, and through a strip aperture 54.

In addition, a strip stop finger 66 is pivotally mounted by a pivot pin 67 in an opening 67' in the overhead guide rail 36 for preventing movement of the blank away from the anvil 21 when the feed finger 48 is being retracted to the right as viewed in FIG. 2. Stop finger 66 includes a latching edge 68 at its forward end which is continuously urged downward and into one of the apertures 54 of the blank by a resilient spring 69 which bears against the edge 70 if the aperture in the guide rail 36 in which the stop finger is located. It will be seen, however, that movement of the blank 32 toward the anvil will not be hindered by finger 66, since this finger will be cammed upward against the force exerted by spring 69 as the blank moves to the left as viewed in FIG. 2 against the inclined back 71 of the finger 66.

The feed finger bracket 62, with its feed finger 48, is positioned upon the end of a piston rod 72 which is attached to the piston 74 of a pneumatic cylinder 76. The cylinder is preferably mounted to the underside of the support rail 34 and includes a pair of heads 77 and 78 which define the ends of the cylinder working chamber 80. In addition, a spring 82 is also positioned in the cylinder 76 which acts between the piston 74 and head 77 so as to continuously urge the piston toward the left as viewed in FIG. 2 toward an advanced feed position. The piston rod 72 also extends from head 77 and is threaded at 83 so as to receive a stroke adjustment nut 84 which may be selectively adjusted to define the length of stroke of the piston 74 toward the left as viewed in FIG. 2. In addition, a stop nut 84' is also positioned on rod 72 between head 78 and the feed finger bracket 62 to limit the movement of the rod to the right as viewed in FIG. 2. Hence the distance by which the feed finger 48 and the bracket 62 move during operation of the feed mechanism may be adjusted to be substantially equal to the distance between the terminals 28 and apertures 54 of the blank 32.

Figures 3, 4, 5:
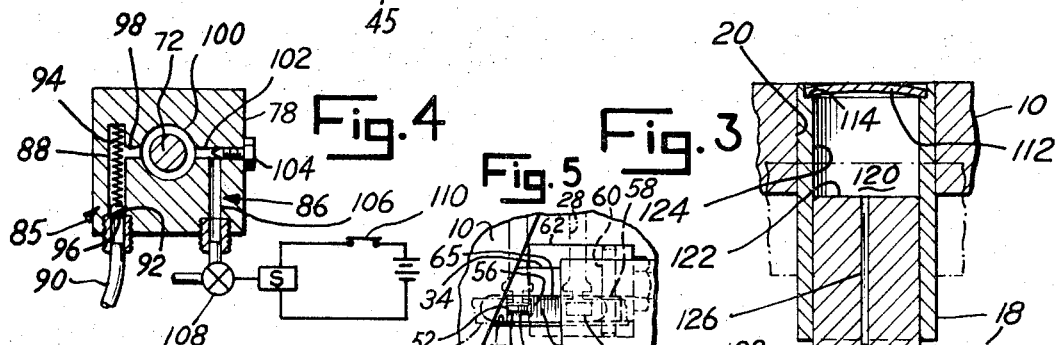
FIG. 3 is a cross sectioned rear elevation view of a preferred embodiment of guide post constructed in accordance with the principles of the invention and taken substantially along line 3 — 3 of FIG. 2.
FIG. 4 is an enlarged cross sectioned end elevation view of a preferred embodiment of feed mechanism cylinder constructed in accordance with the principles of the invention taken substantially along line 4 — 4 of FIG. 2 and showing the check valve and restrictive bleed construction of the cylinder and further showing a preferred embodiment of the present invention in which a solenoid valve is provided to control the discharge of air from the cylinder.
FIG. 5 is a partial enlarged plan view of the assembly showing the feed finger construction of the invention.

Referring particularly to FIG. 4, the head 78 of cylinder 76 also includes check valve and adjustable bleed assemblies 85 and 86. The check valve assembly is positioned in a bore 88 in the head through which air is introduced to the cylinder by way of conduit 90 to pressurize the cylinder and urge the piston 74 to the right as viewed in FIG. 2 against the force of spring 82. As shown in FIG. 4, the check valve assembly 85 comprises a ball check 92 positioned in bore 88 and loaded by a spring 94 against a valve seat 96. When pressurized air is introduced upward as viewed in FIG. 4 to bore 88, the ball check 92 is unseated above lateral passage 98, and air passes through bore 88 and passage 98 and through an annular inlet passage 10 which is formed about the piston rod 72 and from passage 100 into the cylinder working chamber 80. Return flow of pressurized air from the cylinder 76 to the conduit 90, however, is prevented by the ball check 92 which seats upon the valve seat 96 both by the action of the spring force exerted by spring 94 and the air pressure obtaining in the cylinder when the pressure in conduit 90 is reduced.

The bleed assembly 86 includes a laterally extending passage 102 which also leads from annular passage 100, and an adjustable needle valve 104 which may be selectively adjusted to control the flow of fluid from passage 102 and the working chamber 80 of the cylinder. Passage 102, in turn, communicates to the atmosphere by way of bore 106, either directly or by way of a solenoid cutoff valve 108, as shown in FIG. 4. The solenoid valve 108 may be selectively operated by a switch 110 mounted on the terminal applicator for a purpose to be later described.

An important feature of the present invention resides in the construction of the guide post 14 and bushing 18, whereby this structure not only acts to guide the slide head 10 in its movement between its advanced and retracted positions, but also acts a pump for supplying the feed cylinder 76 with the requisite pressurized air for its operation. The bushing 18 is firmly attached to the slide head 10 and is positioned in slideable telescoping relationship to the guide post 14 as shown in FIGS. 2 and 3. The end of this bushing 18 is sealed by way of a suitable plug 112 which is positioned upon a slightly enlarged upper shoulder 114 formed at the top of the bushing sleeve. This plug is preferably held in bushing sealing position by way of friction. A pumping chamber 120 thereby is defined between the plug 112 and the upper surface 122 of the guide post 14 and by the internal walls 124 of the slideable bushing 18.

A bore 126 extends axially from the upper end 122 of the guide post 14 communicating the chamber 120 with a point adjacent the base member 16. A radially extending passage 128 is bored through the side of the cylindrical guide post 14 and communicates with the lower end of bore 126. Passage 128 is formed so as to receive a suitable coupling fitting 130 for coupling the conduit 90 thereto. In addition, a second passage 132 is also bored radially through the side of the guide post 14 and communicates intermediate the length of bore 126 and with the exterior of the guide post at a point such that the passage 132 is covered by the bushing 18 over the substantial portion of the movement of the bushing between the advanced and retracted positions of the slide head, but is uncovered when the slide head has been fully retracted to position R so as to allow for replenishment of air to the pumping chamber 120 prior to the next pumping stroke of the slide head.

Although it is believed that the operation of the terminal applicator assembly of the present invention will be evident upon considering the above described construction of the assembly, a brief description of the operation follows.

It will be assumed that the slide head 10 is in the retracted solid position R shown in FIG. 2 and the lead terminal 28 of blank 32 has been positioned upon the anvil 21 in readiness for the next terminal working operation. At this point, the feed finger 48 will be in the advanced position as shown in solid in FIG. 2 and as determined by the abutment of the adjusting nut 84 against the cylinder head 77 as shown in solid.

Power is now applied to the ram 26 to urge the slide head 10 from its solid retracted position R downward to its advanced article working position A, as shown in dot and dash lines in FIG. 2. As the slide head moves downward, the displacement of the pumping chamber 120 will decrease and pressurize the air which is in the chamber. This pressurized air then passes through bore 126, passage 128, conduit 90, and unseats check valve 92 to flow through bores 88 and 98, annular passage 100 and into the working chamber 80 of the cylinder 76 where it exerts a force upon the left face of piston 74 to urge the piston to the right against the force exerted by spring 82. It will be noted that no air will flow from the pumping chamber 120 through passage 132 during this downward pumping movement of the bushing 18, since passage 132 will be covered by bushing.

Movement of the piston 74 to the retracted dot and dash position as shown in FIG. 2, will draw the feed finger 48 to the right in a retractive direction so as to ready the finger for its next feeding movement. Due to both the sliding action of the cramming surface 56 on the back of feed finger and the ability of the finger to pivot slightly downward against the force exerted by spring 64, the finger will not engage the terminal blank apertures 54 during movement in the retractive direction, but will slide along the underside of the edge strip 40. In addition, backward movement of terminal blank 32 is also prevented by the strip stop finger 66, leading latching edge 68 of which engages one of the apertures 54 in the terminal blank.

Once the die 22 has performed its work upon the terminal which is presently positioned upon the anvil, the slide head 10 is again withdrawn by the ram 26 so as to move upward toward its retracted solid position R as shown in FIG. 2. Return flow of air from the cylinder working chamber 80 to the pumping chamber 120 is prevented, however, by the ball check valve 92 which seats against the valve seat 96. Pressurized air in the chamber 80 is, however, now slowly discharged to the atmosphere through the restrictive bleed assembly 86 to allow delayed movement of the feed finger 48 in the feeding direction and at a speed which is independent of the position or rate of movement of the slide head. Thus, the working chamber 80 is slowly vented to delay the return of the piston by the spring 82, such that the piston 74 and its retracted feed finger 48 are now slowly, but steadily, advanced to the left as viewed in FIG. 2, in the feeding direction. As the finger 48 moves to the left, its leading latching edge 52 engages an aperture 54 in the blank and moves the blank the length of one terminal such that the next terminal on the blank will now be positioned upon the anvil 21. Once the feed finger has been returned to its fully advanced position as shown in solid in FIG. 2, the next terminal will be positioned upon the anvil 21 and the slide head 10 may again be actuated as previously described to the advanced working position A and the sequence of operation repeated.

In certain instances, as for example where it is desired to perform a preliminary operation upon the conductor lead, such as stripping the insulation therefrom, it may be desirable to further delay the movement of the feed finger 48 from its retracted to its advanced positions in the feeding direction. This delay may be accomplished by the closing of a solenoid cutoff valve 108 to entirely cut off the flow of air through the bleed assembly 86 from the cylinder working chamber 80.

Thus, the switch 110 may be selectively actuated to close the valve 108 completely cutting off the flow through the bleed assembly and then may be operated when it is desired to commence feeding motion of the blank to open the valve 108 to return the feed finger to the advanced position as previously described.

It will be understood that, although the present invention has been described in terms of a terminal applicator assembly, the principles of the present invention may be readily practiced in other devices which incorporate a reciprocal tool carrying slide head and article feed mechanism. Moreover, it will also be understood that the embodiments of the present invention which have been described are merely illustrative of some of the applications of the principles of the invention. Numerous modifications may be made by those skilled in the art without departing from the true spirit and scope of the invention.

What is claimed is

1. In an assembly including a power operated slide head adapted to receive an article working tool in mounted relationship thereon, said slide head being power driven between retracted and advanced positions toward and away from a position in which the articles being worked upon are located respectively, and a feed assembly including reciprocal article engaging means and a fluid cylinder with a piston therein for reciprocating the article engaging means in a first feeding direction fo feeding the articles to be worked upon toward said slide head and a second retractive direction opposite to said first feeding direction, fluid pressurizing means connected to said cylinder for introducing fluid under pressure to said piston to urge said piston and article engaging means in said second retractive direction, and force exerting means for urging said piston and article engaging means in said first feeding direction, the improvement in said assembly comprising in combination therewith:

guide post means comprising a first stationary member stationarily fixed to said assembly, a second movable member attached to said slide head and movable therewith and relative to said first member, and said fluid pressurizing means comprises a sealed pumping chamber defined between said first and second members and conduit means communicating said chamber and said cylinder, whereby said guide post means both guides the movement of said slide head between said retracted and advanced positions and urges said piston and article engaging means in said second retractive direction.

2. In the assembly of claim 1 wherein said first stationary member comprises a cylindrical post which extends in a direction parallel to the direction of movement of said slide head, said second movable member comprises a cylindrical bushing fixed to said slide head and slideably positioned over said post, and a head closing one end of said bushing, said pumping chamber being defined between said head and one end of said post, and fluid inlet and discharge means communicating with said chamber.

3. In the assembly of claim 2 wherein said fluid inlet and discharge means comprises a passage in said post extending parallel to the axis of said post, one end of said passage communicating with said chamber and said passage also communicating with said conduit means, and a second passage communicating with said passage intermediate its length, said second passage opening to the atmosphere at a location on said post such that said opening is uncovered by said bushing when said slide head is in its fully retracted position.

4. The assembly of claim 1 wherein said fluid cylinder includes check means for preventing the flow of said fluid from said cylinder and bleed means for restricting the flow of said fluid from said cylinder, said bleed means delaying the movement of said piston and article engaging means in said first feeding direction.

5. The assembly of claim 1 wherein said force exerting means comprises spring means and said cylinder includes bleed means for delaying the movement of said piston and article engaging means by said spring means.

6. The assembly of claim 5 wherein said bleed means restricts the flow of fluid from said cylinder, and selectively operable valve means associated with said bleed means for selectively preventing the flow of fluid from said bleed means.

7. The assembly of claim 1 wherein said piston includes a piston rod extending from said cylinder, said article engaging means being mounted on said rod, and means on said rod for selectively adjusting the length of movement of said article engaging means.

8. The assembly of claim 1 wherein said fluid is air.

9. A press assembly comprising:
a base member,
a plurality of guide posts extending from said base member and stationarily fixed thereto,
a slide head adapted to carry an article working tool thereon, said slide head being slideably mounted for movement on said guide posts between retracted and advanced positions toward and away respectively from said base member,
first cylinder means comprising a pumping chamber defined by said slide head and at least one of said guide posts,
second cylinder means including a piston movable between a first advanced position and a second retracted position,
article engaging means movable in response to movement of said piston for moving an article toward said base member when said piston is moved toward said first advanced position and movable away from said base when said piston is moved toward said second retracted position,
conduit means communicating said pumping chamber of said first cylinder with said second cylinder, said pumping chamber pressurizing said second cylinder upon movement of said slide head toward said advanced position to urge said piston toward said second retracted position,
check means for preventing communication of said second cylinder with said pumping chamber when said slide head is moving toward said retracted position,
spring means in said second cylinder for urging said piston toward said advanced position, and
bleed means for delaying the movement of said piston toward said first advanced position, whereby the movement of said article engaging means toward said base means is delayed.

10. The assembly of claim 9 wherein said first cylinder includes a bushing mounted upon said slide head and slideably received on said one of said guide posts, said bushing being closed at one end such that said bushing and said one of said guide post define said pumping chamber.

11. The assembly of claim 9 including a piston rod connected to the piston of said second cylinder and extending from said second cylinder, and said article engaging means includes a finger attached to said piston rod for movement therewith.

12. The assembly of claim 9 wherein said one of said guide posts includes fluid inlet and discharge means comprising a passage opening through an end of said guide post into said pumping chamber and extending toward the other end of said post adjacent said base member, said conduit means communicating with the passage adjacent said base member, and a second passage communicating with said passage intermediate its length, and a bushing slideably received upon said one of said guide posts and movable in response to movement of said slide head between advanced and retracted positions, said bushing opening said second passage when said slide head is in said retracted position.

13. The assembly of claim 9 wherein said bleed means restricts the flow of fluid from said second cylinder when said piston is moving toward said advanced position, and selectively operable valve means for selectively preventing the flow of fluid from said second cylinder through said bleed means.

* * * * *